United States Patent
Chou et al.

(10) Patent No.: US 12,397,290 B2
(45) Date of Patent: Aug. 26, 2025

(54) BIOCHEMICAL TEST CHIP

(71) Applicant: APEX BIOTECHNOLOGY CORP., Hsinchu (TW)

(72) Inventors: Cheng-Yu Chou, Houlong Township, Miaoli County (TW); Chen-Yu Yang, Toufen (TW)

(73) Assignee: APEX BIOTECHNOLOGY CORP., Hsinchu (TW)

( * ) Notice: Subject to any disclaimer, the term of this patent is extended or adjusted under 35 U.S.C. 154(b) by 0 days.

(21) Appl. No.: 17/487,737

(22) Filed: Sep. 28, 2021

(65) Prior Publication Data
US 2022/0161256 A1   May 26, 2022

(30) Foreign Application Priority Data

Nov. 25, 2020   (TW) ................. 109141392

(51) Int. Cl.
*B01L 3/00*   (2006.01)

(52) U.S. Cl.
CPC ... *B01L 3/502715* (2013.01); *B01L 3/502723* (2013.01); *B01L 2200/0684* (2013.01);
(Continued)

(58) Field of Classification Search
CPC ......... B01L 3/502715; B01L 3/502723; B01L 2200/0684; B01L 2300/0645; B01L 2300/0819; B01L 2300/0887; B01L 2200/0645; G01N 27/3272; G01N 27/3277; G01N 27/327; G01N 27/3275
See application file for complete search history.

(56) References Cited

U.S. PATENT DOCUMENTS 5,120,420 A * 6/1992 Nankai ................. C12Q 1/004
435/817
5,639,631 A   6/1997 Han et al.
(Continued)

FOREIGN PATENT DOCUMENTS

CN   106932601 A   7/2017
TW   201537166 A   10/2015
(Continued)

OTHER PUBLICATIONS

Vasishta Bhatt, Chapter 4—Thermodynamics and Kinetics of Complex Formation, Vasishta Bhatt, Essentials of Coordination Chemistry, Academic Press, 2016, pp. 111-137, ISBN 780128038956, https://doi.org/10.1016/B978-0-12-803895-6.00004-5 https://www.sciencedirect.com/science/article/pii/B978 (Year: 2016).*

(Continued)

*Primary Examiner* — Robert J Eom
(74) *Attorney, Agent, or Firm* — MUNCY, GEISSLER, OLDS & LOWE, P.C.

(57) ABSTRACT

The present disclosure provides a biochemical test chip, including an electrode unit and a protective layer. The protective layer is electrically connected to the electrode unit. The protective layer is configured to oxidize the electrode unit after the electrode unit receives an electron or reduce the electrode unit after the electrode unit loses an electron. There is a potential difference ($E_{cell}^{0}$) between the protecting layer and the electrode unit.

15 Claims, 11 Drawing Sheets

(52) U.S. Cl.
CPC .............. *B01L 2300/0645* (2013.01); *B01L 2300/0819* (2013.01); *B01L 2300/0887* (2013.01)

(56) References Cited

U.S. PATENT DOCUMENTS

| | | | |
|---|---|---|---|
| 8,789,692 B2 | 7/2014 | Chang et al. | |
| 2011/0276278 A1 | 11/2011 | Yu et al. | |
| 2014/0174948 A1* | 6/2014 | Lee .................. | G01N 27/3274 205/777.5 |
| 2018/0143155 A1 | 5/2018 | Cardosi et al. | |
| 2018/0187249 A1 | 7/2018 | Su et al. | |
| 2020/0024632 A1 | 1/2020 | Wu et al. | |

FOREIGN PATENT DOCUMENTS

| | | |
|---|---|---|
| TW | I582418 | 5/2017 |
| TW | I627403 B | 6/2018 |

OTHER PUBLICATIONS

Communication from European Patent Office (EPO)—Examination report issued by dated May 26, 2023.
Extended European Search report dated Mar. 29, 2022 from the EPO counterpart application EP21204355.8, 6 pages.
Office action dated Aug. 22, 2023 from the CNIPA counterpart application 202111175944.9.
Brief translation of the Office action dated Aug. 22, 2023 from the CNIPA counterpart application 202111175944.9.
Office action and Search report dated Nov. 30, 2021 from the TIPO counterpart application TW109141392.
Office action dated Jan. 19, 2024 from the CNIPA counterpart application 202111175944.9.
Brief translation of the Office action dated Jan. 19, 2024 from the CNIPA counterpart application 202111175944.9.
Communication from European Patent Office (EPO)—Examination report issued by dated Dec. 24, 2024 in European application No. EP21204355.8.

* cited by examiner

BIOCHEMICAL TEST CHIP

CROSS-REFERENCE TO RELATED APPLICATIONS

This application claims the benefits of Taiwan Patent Application No. 109141392, filed on Nov. 25, 2020, which is hereby incorporated herein by reference in its entirety.

TECHNICAL FIELD

The present application relates to a biochemical test chip for use in medical measurement, particularly to a biochemical test chip including a protective layer.

BACKGROUND

In-vitro medical measurement plays a vital role in today's medical industry; by qualitatively and quantitatively measuring biological fluids changes, it provides index information for rapid diagnosis and treatment of diseases. The use of biochemical test chips has become a standard technique for medical or biochemical testing.

Conventional biochemical test chips have at least two electrodes. After loading the specimen into the biochemical test chip's reaction zone, the specimen's electrochemical properties can be measured using said two electrodes. For most electrochemical test strips, a reactive layer reacts with a specimen, and the electrochemical properties of the specimen are analyzed by electrochemical means. However, the composition of the reactive layer is extremely sensitive to environmental factors such as temperature, humidity, and oxygen level. For example, the reactive layer's conductive medium is susceptible to oxidation with oxygen in the air. This oxidation reaction can easily cause inaccurate measurement of electrochemical test strips, leading to the short service life of conventional electrochemical test strips.

To address the effect of environmental factors on electrochemical test strips, electrochemical test strips are often stored in containers with desiccant, protected from light, and relatively sealed to avoid damage to electrochemical test strips. However, when the user opens the container to retrieve the electrochemical test strips, the container's internal environment will change when the container is opened, and hence, the other electrochemical test strips stored in the container may be affected. For example, when the electrodes in an electrochemical test strip are exposed to air, water vapor, or other environments, the electrode surface is susceptible to oxidation or reduction reactions that reduce its electron transfer capability and/or increase its impedance. This can still cause inaccurate measurements and reduce the lifetime of the electrochemical test strips.

The "prior art" discussion above merely provides a technology background without acknowledging that the "prior art" discussed above reveal the subject matter of this disclosure and do not constitute prior art at this time and that any of the "prior art" discussion above should not be regarded as any part of the present application.

SUMMARY OF THE INVENTION

The present disclosure provides a biochemical test chip, including an electrode unit and a protective layer. The protective layer is electrically connected to the electrode unit. The protective layer is configured to oxidize the electrode unit after the electrode unit receives an electron or reduce the electrode unit after the electrode unit loses an electron. There is a potential difference ($E_{cell}^{0}$) between the protective layer and the electrode unit.

In some embodiments, the potential difference ($E_{cell}^{0}$) is greater than 0.

In some embodiments, the protective layer is an anode, and the electrode unit is a cathode.

In some embodiments, the protective layer is a cathode, and the electrode unit is an anode.

In some embodiments, the biochemical test chip further includes a first insulating septum, located on the electrode unit, wherein the first insulating septum has a first opening and a second opening, wherein the first opening at least partially exposes the electrode unit, and the second opening at least partially exposes the protective layer.

In some embodiments, the biochemical test chip further includes a second insulating septum, located on the first insulating septum, wherein the second insulating septum has a third opening, and the third opening at least partially exposes the protective layer.

In some embodiments, the electrode unit includes a branch, wherein the branch is configured to provide a conductive platform to the protective layer.

In some embodiments, the electrode unit and the protective layer are substantially located on the same level.

In some embodiments, at least a portion of the electrode unit is made of an active material and is in contact with air.

In some embodiments, the protective layer is configured to protect the portion made of the active material or the whole electrode unit.

The present disclosure provides a biochemical test chip, including a reactive layer, an electrode unit, and a protective layer. The reactive layer is electrically connected to the electrode unit. The protective layer is electrically connected to the electrode unit, and the protective layer is electrically connected to the reactive layer via the electrode unit. The protective layer is configured to oxidize the reactive layer after the reactive layer receives an electron or reduce the reactive layer after the reactive layer loses an electron, wherein there is a potential difference ($E_{cell}^{0}$) between the protective layer and the reactive layer.

In some embodiments, the potential difference ($E_{cell}^{0}$) is greater than 0.

In some embodiments, the protective layer is an anode, and the reactive layer is a cathode.

In some embodiments, the protective layer is a cathode, and the reactive layer is an anode.

In some embodiments, an oxidation or reduction reaction current level of the reactive layer is greater than an oxidation or reduction reaction current level of the protective layer.

In some embodiments, an oxidation or reduction reaction current level of the reactive layer is greater than or equal to 10-fold an oxidation or reduction reaction current level of the protective layer.

The present disclosure's biochemical test chip is disposed with a protective layer, wherein the protective layer can be used to maintain the stability of the biochemical test chip's reactive layer, so as to protect the biochemical test chip, delay or avoid the unwanted spoilage of the biochemical test chip with the environment, thereby prolonging the shelf-life of the biochemical test chip. Besides, the biochemical test chip can be disposed with a plurality of protective layers to protect different components of the biochemical test chip. For example, the protective layer can further protect the working electrode or the counter electrode and the like so as to decrease the measurement error. Moreover, the biochemical test chip can further include a detachable protective layer so as to accelerate the process for the biochemical test chip to return to the default state.

The foregoing outlines the technical features and advantages of the present disclosure so that those skilled in the art may better understand the following detailed description of the present application. Other technical features and advantages that constitute the subject matter of the present disclosure are described below. Those skilled in the art should appreciate that they may readily use the concepts and specific embodiments provided below as a basis for designing or modifying other structures and processes for carrying out the same purposes and/or achieving the same advantages of the present disclosure. Those skilled in the art should also realize that such equivalent constructions still fall within the present disclosure's spirit and scope as defined in the appended claims.

BRIEF DESCRIPTION OF THE DRAWINGS

Aspects of the present disclosure are best understood from the following detailed description and claims when read with the accompanying figures. It is noted that elements with the same reference numbers are the same elements.

DETAILED DESCRIPTION

Figure 1:
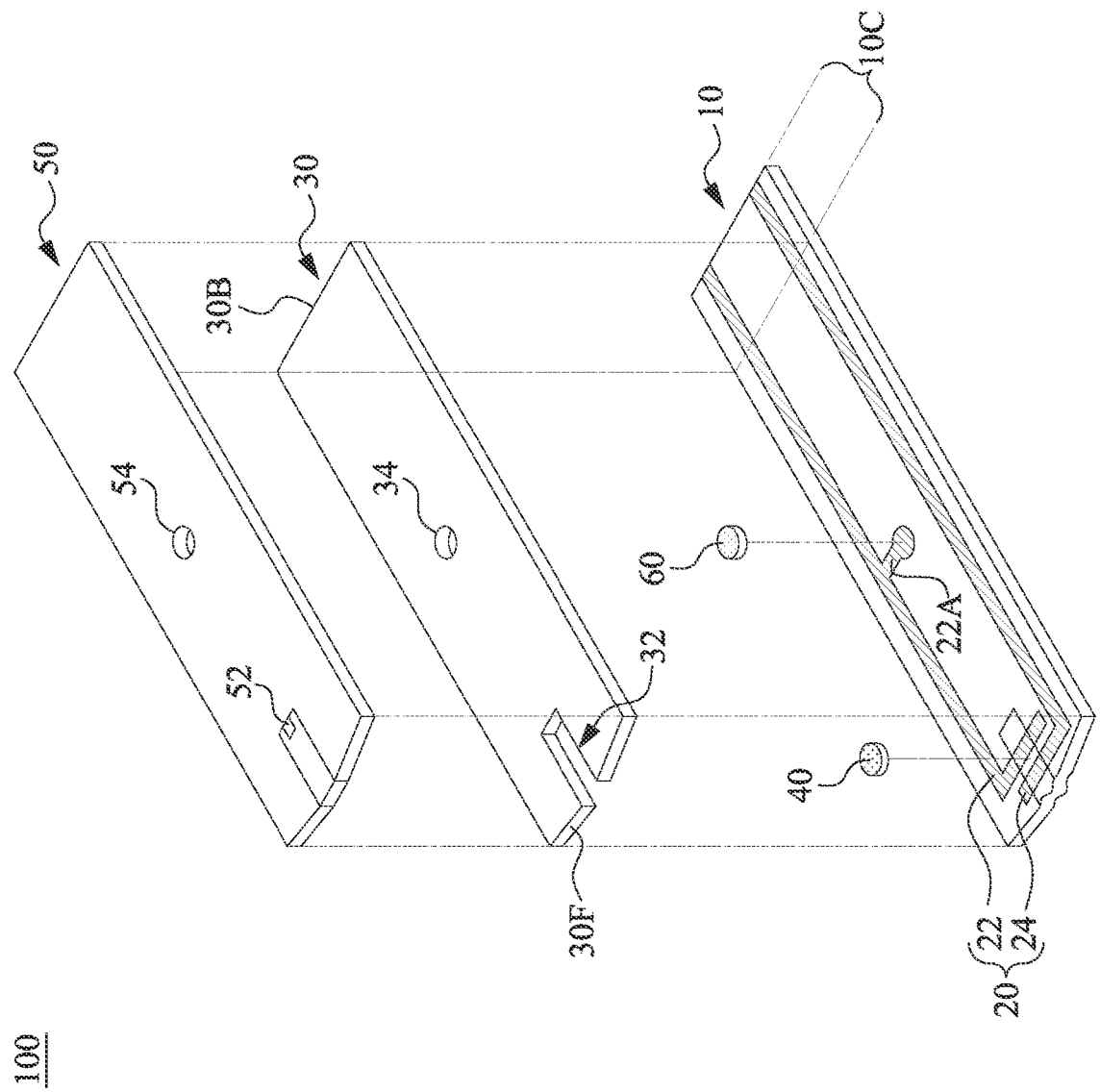
FIG. 1 is a schematic exploded view illustrating a biochemical test chip according to some embodiments of the present disclosure.

Detailed description of the present disclosure is discussed in detail below. However, it should be understood that the embodiments provide many inventive concepts that can be applied in a variety of specific contexts. The specific embodiments discussed are illustrative of the specific ways they can be made and used and do not limit the present disclosure's scope.

The same reference numeral is configured to represent the same elements/components in the various drawings and illustrative embodiments. Reference will now be made in detail to the illustrative embodiments shown in the drawings. Whenever possible, the same reference numeral is used in the drawings and the specification to represent the same or similar parts. In the drawings, the shape and thickness may be exaggerated for clarity and convenience. The description will be directed specifically to the elements forming part of, or more directly cooperating with, the device disclosed hereunder. As could be appreciated, elements not explicitly shown or described may take various forms. The reference to "some embodiments" or "embodiment" throughout this specification implies that the particular features, structures, or characteristics described in conjunction with the embodiment are included in at least one of the embodiments. Therefore, the phrase "in some embodiments" or "in an embodiment" appearing in various places throughout this specification does not necessarily refer to the same embodiment. Besides, the specific features, structures, or characteristics may be combined in any suitable manner in one or more embodiments.

In the drawings, the same reference numeral is configured to indicate the same or similar elements in the various views, and illustrative embodiments of the present application are shown and described. The drawings are not necessarily drawn to scale, and in some cases, the drawings have been exaggerated and/or simplified and are configured for illustrative purposes only. Many possible applications and variations of the present application will be understood by those of ordinary skill in the art in view of the following illustrative embodiments of the present disclosure.

Unless otherwise defined, all terms used herein, including technical and scientific terms, have the same meanings as those commonly understood by a person of ordinary skill in the art in the field of the disclosed embodiments. It should be understood, for example, that terms defined in common dictionaries should be construed to have meanings consistent with their meanings in the relevant field and context of this disclosure and should not be construed or understood to have meanings that are too formal unless expressly defined herein.

Besides, the following embodiments are provided to illustrate the core value of this disclosure but are not intended to limit the scope of protection of this disclosure. For clarity and ease of understanding, the same or similar functions or elements among this disclosure's different embodiments are not repeated or shown in the drawings. Besides, different elements or technical features from different embodiments may be combined or substituted to create further embodiments that are still covered by this disclosure, provided they do not conflict with each other.

The present disclosure is directed to an electrochemical system that sacrifices itself to protect a specific object, particularly to a biochemical test chip of the electrochemical system that sacrifices itself to protect a specific object, in particular. Furthermore, the present disclosure is directed to a biochemical test chip, including a protective layer, wherein the protective layer can sacrifice itself to maintain the stability of one or more components in the biochemical test chip. In some embodiments, the protective layer is configured to protect the object in the biochemical test chip that is protected by the protective layer, such as less-stable components in the biochemical test chip or those suspectable to oxidation or reduction. The subject that is protected by the protective layer can be, for example, the electrode unit or reactive layer in the biochemical test chip; however, the present disclosure is not limited thereto. In detail, the present disclosure slows or avoids one or more components in the biochemical test chip to suffer from spoilage other than medical measurements (e.g., unwanted spoilage upon being exposed to the environment) by sacrificing the protective layer (such as by allowing the protective layer to undergo the oxidation or reduction reaction). Depending on the chemical properties of the object to be protected, the protective layer sacrifices itself to undergo the corresponding scarification (e.g., the oxidation or reduction reaction) to facilitate said component(s) to return to the default state or to provide or receive electrons before the component is spoiled, thereby attaining the technical effect of protecting the components.

For example, when it is expected to keep the object to be protected stably in the reduced state, materials capable of providing electrons are chosen to form the protective layer. In other words, when the object to be protected is spoiled because it loses electrons, if the protective layer is made from materials capable of providing or losing electrons, then the protective layer can lose electrons first or compensate for the electrons that the object to be protected loses before the object to be protected loses electrons. In this way, it is feasible to keep the object to be protected stably in the reduced state.

On the other hand, when it is expected to keep the object to be protected stably in the oxidized state, materials capable of receiving electrons are chosen to form the protective layer. In other words, when the object to be protected is spoiled because it receives electrons, if the protective layer is made from materials capable of capturing or accommodating electrons, then the protective layer can obtain electrons first before the object to be protected receives electrons. In this way, it is feasible to keep the object to be protected stably in the oxidized state.

Generally, substances with a higher standard reduction potential tend to receive electrons, whereas substances with a lower standard reduction potential tend to lose electrons. According to the Gibbs Free Energy relationship, i.e., $\Delta G^0 = -nFE_{cell}^0$, where $\Delta G^0$ is the change in the free energy, n is the mole number of electrons, and F is the charge per mole. The equation for the potential difference ($E_{cell}^0$) is $E_{cell}^0 = E_{cathode} - E_{anode}$, where $E_{cathode}$ is the standard reduction potential of a cathode (cathode electrode), and $E_{anode}$ is the standard reduction potential of an anode (anode electrode). When the Gibbs free energy $\Delta G^0 < 0$, the reaction is spontaneous. From the above, it can be seen that when two oxidizable/reduceable substances with a potential difference ($E_{cell}^0$) are in the same reaction tank, the one with higher standard reduction potential will tend to undergo reduction reaction, and the other one will tend to undergo oxidation reaction. For example, when the standard reduction potential of the anode is smaller than that of the cathode, the anode will spontaneously transfer electrons to the cathode, and the cathode will remain in the reduced state because it continues to receive electrons, thus avoiding the influence of environmental oxidants (e.g., oxygen, water vapor, etc.).

Therefore, by disposing the protective layer and the object to be protected in the same reaction tank, and allowing the two to have a potential difference ($E_{cell}^0$), wherein the potential difference ($E_{cell}^0$) is greater than 0, it is feasible to allow the protective layer and the object to be protected to generate an electron flow in a specific direction spontaneously so that the object to be protected can be kept in its original redox state. In this way, the biochemical test chip is protected to slow or avoid the unwanted spoilage of the biochemical test chip with the environment.

Depending on the protective layer's materials and the subject to be protected, the protective layer and the object to be protected can respectively be an anode and a cathode, and the protective layer and the object to be protected can also be a cathode and an anode, respectively. The following paragraphs provide several embodiments of the present disclosure, which are used as examples to illustrate the core value of the present disclosure; however, they are not used to limit the protection scope of the present disclosure.

Reference is made to FIG. 1, FIG. 1 is a schematic exploded view illustrating a biochemical test chip 100 according to some embodiments of the present disclosure. The biochemical test chip 100 can be an electrochemical test chip, which is a device that can be electrically connected to. The biochemical test chip 100 is configured to collect a specimen and carry out an electrochemical reaction therewith so as to detect a target analyte therein. The specimen includes any liquids or soluble solids having therein one target analyte that can be detected using an electrochemical method. For example, the specimen may include blood, tissue fluid, urine, sweat, tears, and other biological samples; however, the present disclosure is not limited thereto. Moreover, the blood can include the whole blood, plasma, serum, etc.; however, the present disclosure is not limited thereto.

Reference is made to FIG. 1; the biochemical test chip 100 includes an insulating substrate 10, an electrode unit 20, a first insulating septum 30, a reactive layer 40, a second insulating septum 50, and the protective layer 60. The insulating substrate 10 includes a substrate that is electrically insulated. In some embodiments, the material of the insulating substrate 10 can include polyvinyl chloride (PVC), glass fiber (FR-4), polyethersulfone (PES), bakelite, polyethylene terephthalate (PET), polycarbonate (PC), polypropylene (PP), polyethylene (PE), polystyrene (PS), polyimide (PI), glass plate, ceramic or any combination of the above-mentioned materials; however, the present disclosure is not limited thereto. The material of the insulating substrate 10 can be adjusted depending on the system or actual needs.

The electrode unit 20 of the biochemical test chip 100 is located on the insulating substrate 10. The electrode unit 20 is disposed on the insulating substrate 10 and configured to be subjected to the electrochemical measurement. The electrochemical measurement includes analyzing the specimen's concentration using an electrical reaction, such as potentiometry, conductometry, voltammetry, polarimetry, high-frequency titration, amperometry, Coulombic method, electrolysis, and the like. The electrode unit 20 includes a working electrode 22 and a counter electrode 24; however, the present disclosure is not limited thereto. The electrode unit 20 can have other electrodes depending on the requirements of the system. The working electrode 22 is the electrode that allows the conductive medium to undergo the electrooxidation reaction or electroreduction reaction on the surface thereof and can be used by the measuring apparatus to determine the concentration. In detail, the electrooxidation reaction or electroreduction reaction is an electrochemical reaction in which the conductive medium undergoes an exchange between electrical and chemical energy on the surface of the working electrode 22.

The polarity of the working electrode 22 can be an anode or a cathode, depending on the requirement of the measurement reaction. For example, if the conductive medium is oxidized on the working electrode 22, the working electrode 22 is an anode; if the conductive medium is reduced on the working electrode 22, the working electrode 22 is a cathode. The counter electrode 24 is an electrode that undergoes the electroreduction reaction or electrooxidation reaction corresponding to the working electrode 22 so that the overall electrochemical system satisfies the principles of charge balance. The potential and polarity of the counter electrode 24 are opposite to the potential and the polarity of the working electrode 22. Before being in contact with the specimen, the working electrode 22 and the counter electrode 24 are insulated from each other. After the working electrode 22 and the counter electrode 24 are in contact with the specimen, they form an electrical loop with the measuring apparatus. In some embodiments, the working electrode 22 and the counter electrode 24 can include a carbon electrode, silver electrode, platinum electrode, etc.; however, the present disclosure is not limited thereto.

The materials of the working electrode 22 and the counter electrode 24 can vary depending on the system's requirement.

The first insulating septum 30 is disposed on the insulating substrate 10 and located on the electrode unit 20. The first insulating septum 30 can have an opening 32, wherein the opening 32 at least partially exposes the electrode unit 20. In some embodiments, the opening 32 is located at the front side 30F of the first insulating septum 30 and exposes a portion of the electrode unit 20. The opening 32 is configured to define a reaction zone 34 in the biochemical test chip 100; the reaction zone 34 is configured to accommodate the specimen. The electrode unit 20 is exposed from the portion of the opening 32 and can undergo the electrochemical reaction with the specimen. The size or shape of the opening 32 can be adjusted according to the desired area of the electrode unit 20 and the desired volume of the specimen. In some embodiments, the backside 30B of the first insulating septum 30 exposes a portion of the electrode unit 20 to form a connecting zone 10C. The electrode unit 20 exposed from the connecting zone 10C can be electrically connected to a measuring apparatus (not shown in the drawings). The measuring apparatus and the biochemical test chip 100 are electrically connected to provide the energy required for the electrochemical measurement and analyze the reaction signal. In some embodiments, the material of the first insulating septum 30 includes a PVC insulation tape, PET insulation tape, heat drying insulation paint, or ultraviolet (UV) curable insulation paint; however, the present disclosure is not limited thereto.

Figure 2:
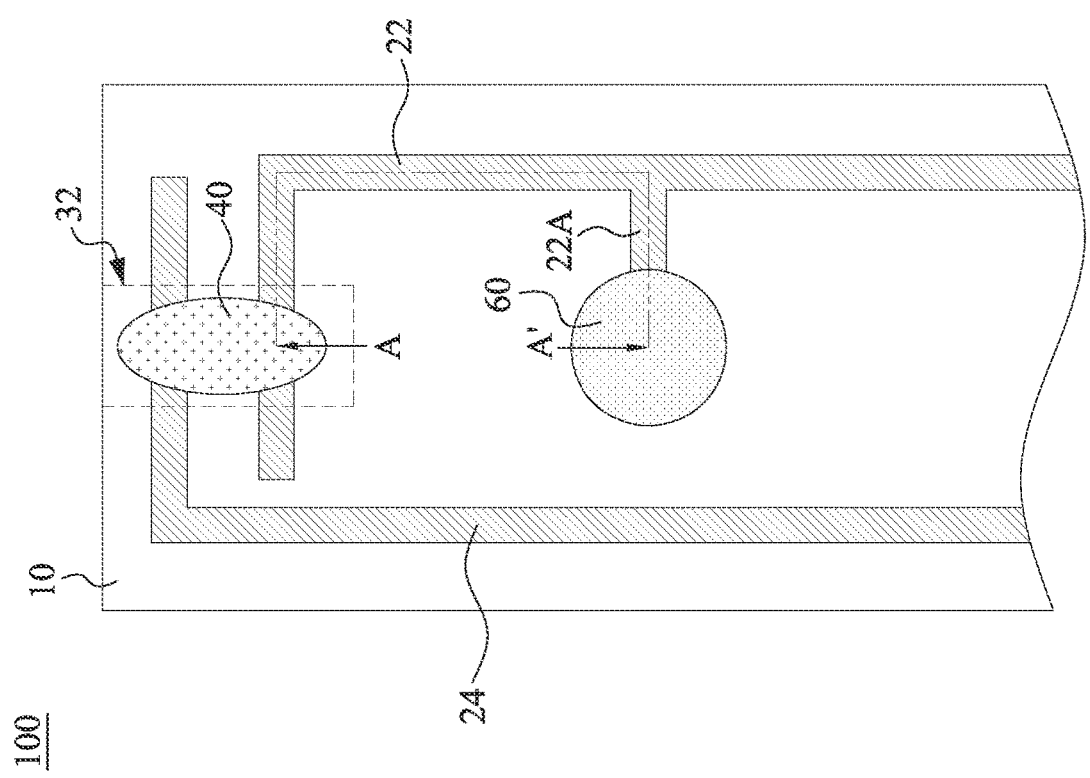
FIG. 2 is a partial top view illustrating a biochemical test chip according to some embodiments of the present disclosure

FIG. 2 is a partial top view illustrating the biochemical test chip 100 according to some embodiments of the present disclosure. Reference is made to FIG. 2 and FIG. 1 simultaneously; the biochemical test chip 100 further includes a reactive layer 40. The reactive layer 40 is located in the opening 32 of the first insulating septum 30. The reactive layer 40 is 1 electrically connected to the electrode unit 20. In some embodiments, the area of the reactive layer 40 is smaller than the size of the opening 32. The reactive layer 40 at least partially covers the electrode unit 20 exposed from the opening 32. In some embodiments, the reactive layer 40 covers both the working electrode 22 and the counter electrode 24. In some embodiments, the reactive layer 40 only covers the working electrode 22. The reactive layer 40 is configured to undergo a chemical reaction with the specimen. In other embodiments, the biochemical test chip 100 does not include the reactive layer 40.

In some embodiments, the reactive layer 40 includes an enzyme and a conductive medium. For example, the enzyme includes a fixed or non-fixed enzyme, such as redox enzymes, antigens, antibodies, microbial cells, animal and plant cells, and biologically identifiable components of animal and plant tissues. The conductive medium is configured to receive electrons generated after the reaction between the enzyme and a blood specimen and transmit the electrons to the measuring apparatus via the electrode unit 20. In some embodiments, the conductive medium can include potassium hexacyanoferrate(III), potassium hexacyanoferrate(II) trihydrate, ruthenium complex, ferrocene, sodium dithionite, nicotinamide adenine dinucleotide (NAD+), nicotinamide adenine dinucleotide phosphate (NADP+), thiamin pyrophosphate (TPP), coenzyme A (HS-CoA), flavin adenine dinucleotide (FAD) or a combination thereof; however, the present disclosure is not limited thereto. In some embodiments, the reactive layer 40 can be further supplemented with a phosphate buffer and protectants, such as a protein, dextrin, glucan, amino acid, etc.; however, the present disclosure is not limited thereto.

Reference is made again to FIG. 1; the second insulating septum 50 is located on the first insulating septum 30. In some embodiments, the second insulating septum 50 at least partially covers the opening 32 of the first insulating septum 30 so that the opening 32 forms a capillary structure. In some embodiments, the terminus of the second insulating septum 50 is disposed with a vent 502 corresponding to the opening 32. The vent 52 can be of any shape; for example, the vent 52 can be circular, oval, rectangular, rhombus, etc. In some embodiments, the second insulating septum 50 also exposes the connecting zone 10C of the electrode unit 20. The second insulating septum 50 can be of any shape or size.

Reference is made to FIG. 2 and FIG. 1 simultaneously; the biochemical test chip 100 further includes the protective layer 60. For example, water vapor or oxygen and the like in the environment may exist between the insulating substrate 10 and the first insulating septum 30. Therefore, the reactive layer 40 exposed to the environment and the electrode unit 20 disposed between the insulating substrate 10 and the first insulating septum 30 may get spoiled upon being oxidized with the water vapor or oxygen in the air.

In the present embodiment, the protective layer 60 can be configured to protect the reactive layer 40 in the biochemical test chip 100 to slow or avoid the unwanted spoilage of the biochemical test chip 100 in the environment.

In some embodiments, as shown in FIG. 1, the first insulating septum 30 can have an opening 34, and the second insulating septum 50 can have an opening 54, wherein the opening 34 and the opening 54 at least partially expose the protective layer 60. The protective layer 60 and the reactive layer 40 can be exposed to the same environment; however, the present disclosure is not limited thereto. For example, the protective layer 60 can be disposed between the insulating substrate 10 and the first insulating septum 30 and is exposed to the same environment as the reactive layer 40 via the opening 34 and the opening 54. In other embodiments, the protective layer 60 can and the reactive layer 40 are exposed to different environments. For example, the protective layer 60 can be disposed between the insulating substrate 10 and the first insulating septum 30, and the first insulating septum 30 and the second insulating septum 50 do not have the opening 34 and opening 54.

The protective layer 60 is disposed at a specific region of the electrode unit 20. For example, the protective layer 60 is disposed on the working electrode 22; however, the present disclosure is not limited thereto. As shown in FIG. 1, the protective layer 60 is disposed on the electrode unit 20 and is electrically connected to the electrode unit 20. The protective layer 60 and the reactive layer 40 are electrically coupled via the electrode unit 20. In the present embodiment, the protective layer 60 is electrically connected to the reactive layer 40 via the working electrode 22; however, the present disclosure is not limited thereto. In other embodiments, the protective layer 60 can be electrically connected to the reactive layer 40 via the counter electrode 24. The position of the protective layer 60 is not limited to those described above; in some embodiments, the protective layer 60 can be disposed on the second insulating septum 50 and electrically connected to the electrode unit 20 via wires. In other embodiments, the protective layer 60 can be disposed between the first insulating septum 30 and the second insulating septum 50 and electrically connected to the electrode unit 20 via wires.

The protective layer 60 can take the forms of solid, liquid, or gas. For example, solids can include pure metals, alloys, metal compounds (halides, oxidates, mixed-valence compounds, organometallic complexes), organic redox agents, etc. Liquids can include aqueous solutions, organic solutions, supercritical fluids, liquid elements (e.g., bromine, mercury), etc. Gases can include gaseous elements (e.g., oxygen, ozone), gaseous compounds (e.g., ammonium, nitrogen monoxides) etc.

In the present embodiment, the protective layer 60 is configured to protect the reactive layer 40 in the biochemical test chip 100. The protective layer 60 and the reactive layer 40 can have different materials or compositions. For example, the protective layer 60 and the reactive layer 40 can have different standard reduction potential s, and hence, there is a potential difference ($E_{cell}^0$) between the protective layer 60 and the reactive layer 40. The potential difference ($E_{cell}^0$) between the protective layer 60 and the reactive layer 40 is greater than 0. The protective layer 60 and the reactive layer 40 are in the same reaction environment. In some embodiments, the protective layer 60 and the reactive layer 40 are in contact with air simultaneously; however, the present disclosure is not limited thereto. The protective layer 60 and the reactive layer 40 electrically connected to the electrode unit 20 simultaneously can also be considered the two being in the same reaction environment. Because there is a potential difference ($E_{cell}^0$) between the protective layer 60 and the reactive layer 40, and the potential difference ($E_{cell}^0$) is greater than 0, an electron flow in a specific direction is generated spontaneously so that the object to be protected (the reactive layer 40) can be kept in its original redox state. In this way, the biochemical test chip 100 is protected to slow or avoid the unwanted spoilage of the biochemical test chip 100 with the environment.

Figure 3:
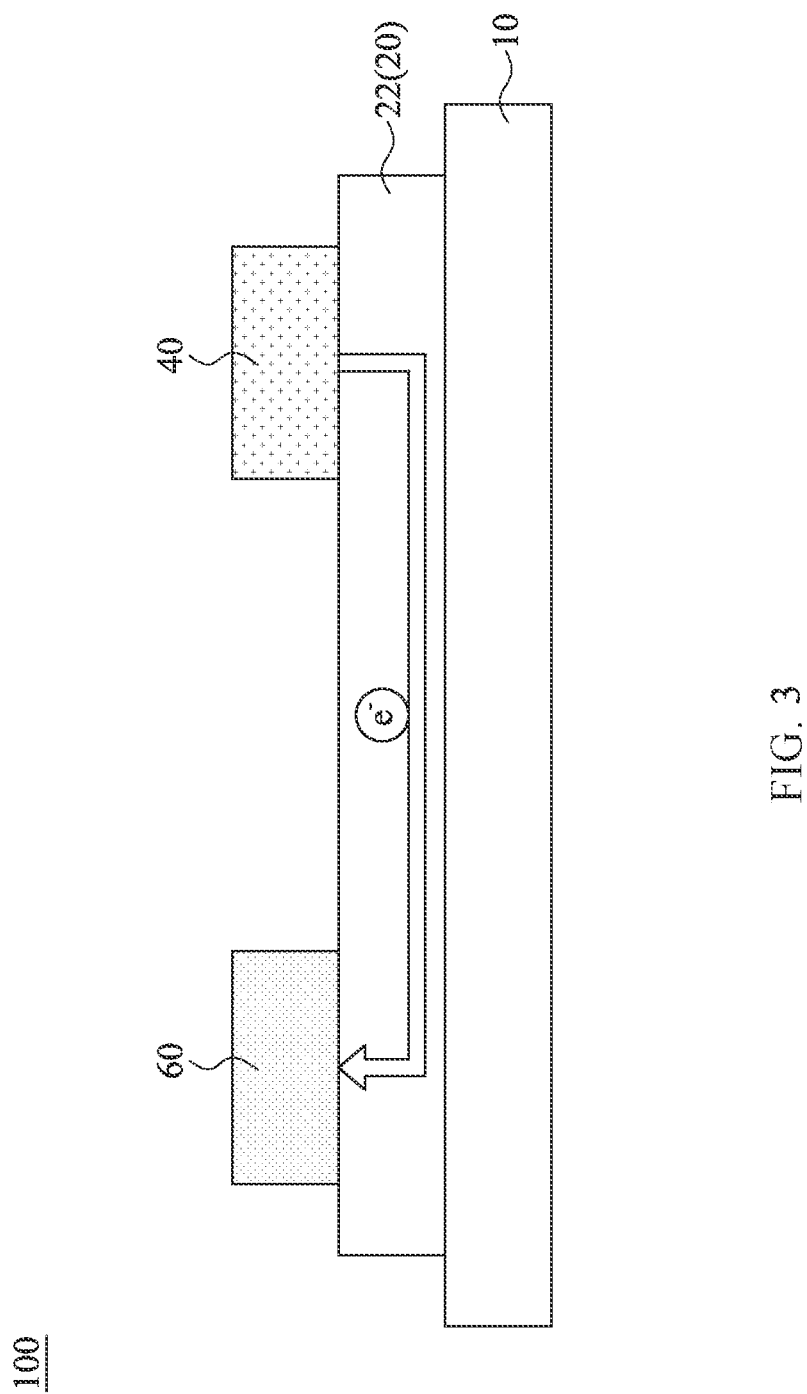
FIG. 3 is a schematic cross-sectional view taken from the line A-A' in FIG. 2.
Figure 4:
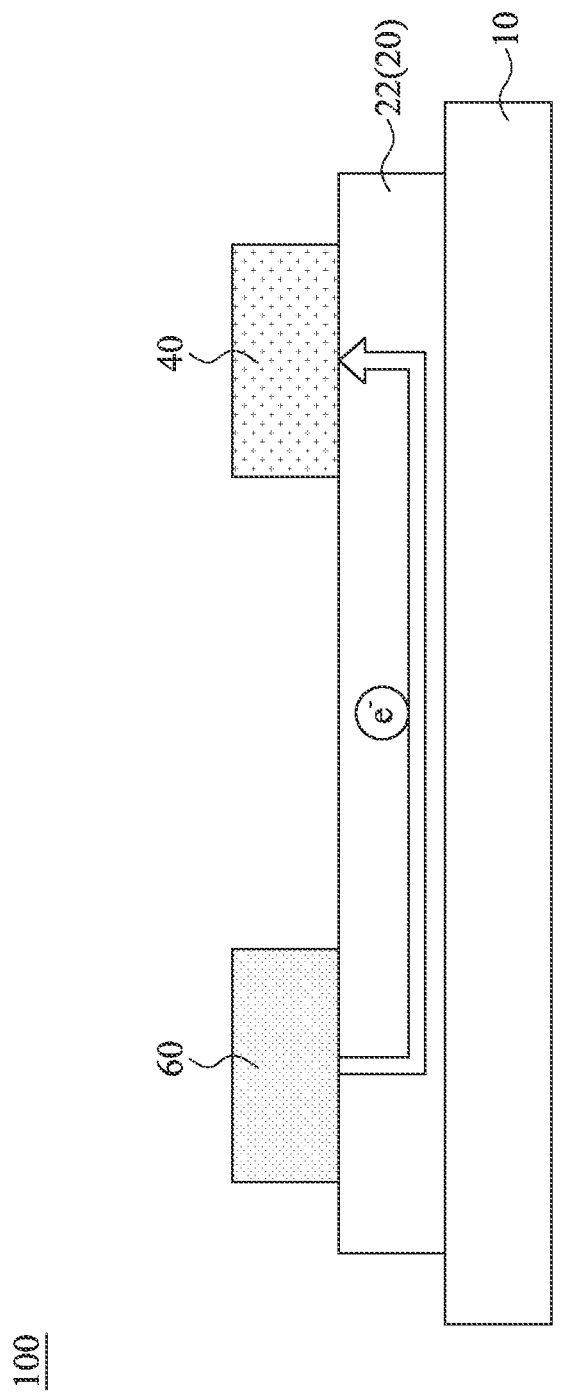
FIG. 4 is a schematic cross-sectional view taken from the line A-A' in FIG. 2.

Depending on the materials of the protective layer 60 and the reactive layer 40, the protective layer 60 and the reactive layer 40 can respectively be an anode and a cathode, and the protective layer 60 and the reactive layer 40 can also be a cathode and an anode, respectively. In the following paragraphs, FIG. 3 and FIG. 4 are respectively used to discuss the examples where the protective layer 60 is the cathode and the reactive layer 40 is the anode, and the protective layer 60 is the anode and the reactive layer 40 is the cathode. In some embodiments, the area of the protective layer 60 is greater than the area of the reactive layer 40. In some embodiments, the area of the protective layer 60 is substantially the same as the area of the reactive layer 40. The area and the thickness of the protective layer 60 and the reactive layer 40 can be adjusted depending on the system requirements.

Reference is made to FIG. 3; FIG. 3 is a schematic cross-sectional view taken from the line A-A' in FIG. 2. In the present embodiment, the conductive medium of the reactive layer 40 can be ferricyanide (hexacyanoferrate (III)); however, ferricyanide tends to be reduced into ferrocyanide (hexacyanoferrate(II)) upon light irradiation, wherein the reaction equation can be expressed as $Fe^{III}(CN)_6^{3-} \xrightarrow{hv} Fe^{II}(CN)_6^{4-}$. When ferricyanide is reduced into ferrocyanide conductive medium, this spoilage results in the increases of the background current when the biochemical test chip 100 performs the concentration measurement, thereby causing measurement errors.

As shown in FIG. 2 and FIG. 3, the biochemical test chip 100 of the present disclosure is disposed with the protective layer 60, wherein the protective layer 60 is electrically connected to the reactive layer 40 via the electrode unit 20. Thus, when the biochemical test chip 100 is exposed to the environment and before the specimen is loaded, the reactive layer 40, the electrode unit 20, the protective layer 60, and the air form a chemical reaction tank. In the present embodiment, the material of the protective layer 60 can be silver oxide (silver peroxide). Silver oxide can undergo the reduction reaction and give silver, wherein the reaction equation can be expressed as $Ag_2O + 2H^+ + 2e^- \rightarrow 2Ag + H_2O$. The standard reduction potential of silver oxide/silver is about 1.77 V, and the standard reduction potential of ferricyanide/ferrocyanide is about 0.36 V. Therefore, in the present embodiment, the protective layer 60 is the cathode, whereas the reactive layer 40 is the anode. The potential difference ($E_{cell}^0$) between the protective layer 60 and the reactive layer 40 is 1.41 V. Since the potential difference between the two is greater than 0, the change in free energy is smaller than 0, and thus, ferrocyanide in the reactive layer 40 undergoes spontaneous oxidation reaction into ferricyanide, wherein the reaction equation can be expressed as $2Fe(CN)_6^{4-} + Ag_2O + 2H^+ \rightarrow 2Fe(CN)_6^{3-} + 2Ag + H_2O$. In this case, the half-reaction taking place on the reactive layer 40 is $Fe^{II}(CN)_6^{4-} \rightarrow Fe^{III}(CN)_6^{3-} + e^-$.

In view of the above, ferrocyanide in the reactive layer 40 is oxidized into ferricyanide because of the reduction reaction of silver oxide in the protective layer 60. When the reduction reaction of the protective layer 60 takes place, the reactive layer 40 undergoes the oxidation reaction, thereby mitigating the reduction reaction due to the light irradiation. Therefore, by disposing the protective layer 60 in the biochemical test chip 100, it is feasible to effectively avoid the conductive medium in the reactive layer 40 from being spoiled before measuring the specimen. The composition materials of the conductive medium of the reactive layer 40 and the protective layer 60 are not limited to those discussed above. In some embodiments, the composition materials of the conductive medium of the reactive layer 40 and the protective layer 60 are selected so that the potential difference ($E_{cell}^0$) between the two is greater than 0.

In the present embodiment, a method for protecting the biochemical test chip 100 is provided. In detail, the present method for protecting the biochemical test chip 100 includes providing the protective layer 60 electrically connected to the electrode unit 20, wherein the protective layer 60 is electrically connected to the reactive layer 40 via the electrode unit 20. The protective layer 60 is configured to oxidize the reactive layer 40 after the reactive layer 40 receives electrons. As discussed above, ferricyanide in the reactive layer 40 tends to receive electrons and thus is reduced into ferrocyanide upon light irradiation. Hence, one may choose a material with a standard reduction potential greater than the standard reduction potential of ferricyanide/ferrocyanide as the protective layer 60; for example, one may choose silver oxide as the protective layer 60. Therefore, after the reactive layer 40 receives electrons, the protective layer 60 allows the reactive layer 40 to undergo the oxidation reaction so that the reactive layer 40 returns to the default state. In the present embodiment, the standard reduction potential of the reactive layer 40 is smaller than the standard reduction potential of the protective layer 60; however, the present disclosure is not limited thereto.

Reference is made to FIG. 4; FIG. 4 is a schematic cross-sectional view taken from the line A-A' in FIG. 2. In the present embodiment, the standard reduction potential of the reactive layer 40 is greater than the standard reduction potential of the protective layer 60. In the present embodiment, the conductive medium of the reactive layer 40 can be ferrocyanide; however, ferrocyanide, when being exposed to the air, tends to be oxidized by oxygen into ferricyanide, wherein the reaction equation can be expressed as $Fe^{II}(CN)_6^{4-}+O_2+2H^+ \rightarrow 2Fe^{III}(CN)_6^{3-}+H_2O_2$. When ferrocyanide is oxidized into ferricyanide after it is in contact with oxygen, this spoilage results in the change of the conductive medium's concentration in the biochemical test chip 100, thereby affecting the background current and causing measurement errors.

As shown in FIG. 2 and FIG. 4, the biochemical test chip 100 of the present disclosure is disposed with the protective layer 60, wherein the protective layer 60 is electrically connected to the reactive layer 40 via the electrode unit 20. Thus, when the biochemical test chip 100 is exposed to the environment and before the specimen is loaded, the reactive layer 40, the electrode unit 20, the protective layer 60, and air form a chemical reaction tank. In the present embodiment, the material of the protective layer 60 can be iron. When being exposed to the air, iron tends to undergo oxidation reaction with water vapor, wherein the half-reaction equation can be expressed as $Fe+2OH^- \rightarrow Fe(OH)_2+2e^-$. The standard reduction potential of ferricyanide/ferrocyanide is about 0.36 V, whereas the standard reduction potential of iron(II) hydroxide/iron is about −0.89 V. Thus, in the present embodiment, the reactive layer 40 is the cathode, and the protective layer 60 is the anode. When the biochemical test chip 100 is exposed to the environment having water vapor and oxygen, the potential difference ($E_{cell}^o$) between the protective layer 60 and the reactive layer 40 is 1.25 V. Since the potential difference between the two is greater than 0, the change in free energy is smaller than 0; and hence, ferricyanide in the reactive layer 40 undergoes the spontaneous reduction reaction into ferrocyanide, wherein the reaction equation can be expressed as $2Fe^{III}(CN)_6^{3-}+Fe+2OH^- \rightarrow 2Fe^{II}(CN)_6^{4-}+Fe(OH)_2$. In this case, the half-reaction on the reactive layer 40 can be expressed as $Fe^{III}(CN)_6^{3-}+e^- \rightarrow Fe^{II}(CN)_6^{4-}$.

Hence, ferricyanide in the reactive layer 40 is reduced into ferrocyanide because of iron's oxidation reaction in the protective layer 60. When the oxidation reaction of the protective layer 60 takes place, the reactive layer 40 undergoes the reduction reaction, thereby slowing the oxidation reaction due to oxygen in the air. Besides, the reactive layer 40 is protected by the oxidation of the water vapor in the air to iron so as to keep the desired stability of the conductive medium of the reactive layer 40. Therefore, by disposing the protective layer 60 in the biochemical test chip 100, it is feasible to effectively avoid the conductive medium in the reactive layer 40 from being spoiled before measuring the specimen. The composition materials of the conductive medium of the reactive layer 40 and the protective layer 60 are not limited to those discussed above.

In the present embodiment, a method for protecting the biochemical test chip 100 is provided. In detail, the present method for protecting the biochemical test chip 100 includes providing the protective layer 60 electrically connected to the electrode unit 20, wherein the protective layer 60 is electrically connected to the reactive layer 40 via the electrode unit 20. The protective layer 60 is configured to reduce the reactive layer 40 after the reactive layer 40 loses electrons. As discussed above, ferrocyanide in the reactive layer 40 tends to be oxidized into ferricyanide by oxygen when being exposed to the air. Hence, one may choose a material with a standard reduction potential smaller than the standard reduction potential of ferricyanide/ferrocyanide as the protective layer 60; for example, one may choose iron as the protective layer 60. Therefore, after the reactive layer 40 loses electrons, the protective layer 60 allows the reactive layer 40 to undergo the reduction reaction so that the reactive layer 40 returns to the default state. In the present embodiment, the standard reduction potential of the reactive layer 40 is greater than the standard reduction potential of the protective layer 60; however, the present disclosure is not limited thereto.

The foregoing are examples of the protective layer 60 and the reactive layer 40, and the present disclosure is not limited thereto. By choosing appropriate materials as the protective layer 60, it is feasible that the potential difference ($E_{cell}^o$) between the protective layer 60 and the reactive layer 40 is greater than 0. In this way, the protective layer 60 and the reactive layer 40 are under spontaneous reactions so as to protect the biochemical test chip 100 and prolong the shelf-life of the biochemical test chip 100.

The material of the protective layer 60 can be determined based on the material of the reactive layer 40. For example, when it is desired to stabilize the conductive medium of the reactive layer 40 in the oxidized state, materials suitable for use as a cathode are chosen as the material of the protective layer 60, i.e., materials capable of receiving electrons can be used. In other words, when the reactive layer 40 spoils upon receiving electrons, materials capable of capturing or accommodating electrons are chosen as the material of the protective layer 60; hence, the protective layer 60 receives electrons first before the reactive layer 40 receives electrons. In this way, the reactive layer 40 is stabilized in the oxidized state. Generally, substances with a higher standard reduction potential tend to receive electrons, whereas substances with a lower standard reduction potential end to lose electrons. When it is expected to keep the reactive layer 40 stably in the oxidized state, materials with a standard reduction potential greater than that of the reactive layer 40 are chosen to form the protective layer 60.

When it is expected to keep the reactive layer 40 stably in the reduced state, materials suitable for use as an anode are chosen as the material of the protective layer 60; i.e., materials capable of providing electrons can be used. In other words, when the reactive layer 40 is spoiled because it loses electrons, if the protective layer 60 is made from materials capable of providing or losing electrons, then the protective layer 60 can lose electrons first or compensate for the electrons that the reactive layer 40 loses before the reactive layer 40 loses electrons. In this way, it is feasible to keep the reactive layer 40 stably in a reduced state. As discussed above, when it is expected to keep the reactive layer 40 stably in the reduced state, materials with a standard reduction potential lower than that of the reactive layer 40 are chosen to form the protective layer 60.

Generally, in addition to the reactive layer 40, components in the biochemical test chip 100 that are susceptible to redox reaction further include the working electrode 22 and the counter electrode 24. In some embodiments, the biochemical test chip 100 can be disposed with an additional protective layer to protect the working electrode 22 or the counter electrode 24. In some embodiments, the protective layer 60 can protect the working electrode 22 and the reactive layer 40 simultaneously. In some embodiments, the protective layer 60 must be in physical contact with the object to be protected to provide the protection. The subject to be protected can include the reactive layer 40, the working electrode 22, the counter electrode 24, or other units in the biochemical test chip 100. In other embodiments, the protective layer 60 can protect the protection by merely being electrically coupled to the object to be protected. In some embodiments, when the protective layer 60 is in contact with an object to be protected that is made of compounding materials, one should avoid the counterreaction on the parts other than the object to be protected. Hence, the protective layer 60 is designed to be in electrical contact only with the object to be protected.

It should be noted that in order to prevent the protective layer 60 from interfering with the biochemical test chip 100 during the electrochemical measurement, the protective layer 60 according to the present disclosure is disconnected during the concentration measurement reaction. In some embodiments, as shown in FIG. 2, the protective layer 60 is connected in series with the reactive layer 40 via the working electrode 22 and the branch 22A thereof. In some embodiments, the protective layer 60 can be connected to the multiple branches of the working electrode 22 so as to form a parallel connection with the reactive layer 40. In some embodiments, the biochemical test chip 100 may be connected to a circuitry switch that disconnects the protective layer 60 through the circuitry switch while the biochemical test chip 100 is under the electrochemical measurement. When the biochemical test chip 100 is electrically connected to the measuring instrument, the protective layer 60 is electrically separated from the electrode unit 20. Besides, the biochemical test chip 100 is electrochemically measured by providing a reaction potential through an external meter to drive the concentration measurement reaction. The order of magnitude of the chemical reactions in the reaction layer 40 will be much higher than the oxidation or reduction chemical reactions between the protective layer 60 and the reaction layer 40. Thus, the protective layer 60 will not affect the concentration measurement reaction of the biochemical test chip 100. In some embodiments, the oxidation or reduction reaction current level of the reaction layer 40 is greater than or equal to 10 times (inclusive) the oxidation or reduction reaction current level of the protective layer 60. In some embodiments, the oxidation or reduction reaction current level of the reaction layer 40 is greater than or equal to 50 times (inclusive) the oxidation or reduction reaction current level of the protective layer 60. In some embodiments, the oxidation or reduction reaction current level of the reaction layer 40 is greater than or equal to 100 times (inclusive) the oxidation or reduction reaction current level of the protective layer 60. For example, to ensure that the oxidation or reduction reaction of the protective layer 60 does not interfere with the measurement reaction (i.e., the reaction of the reaction layer 40), if the minimum oxidation or reduction reaction current level of the reaction layer 40 (i.e., the lowest concentration oxidation or reduction reaction current level on the system specification) is 1 microampere ($\mu A$), the oxidation or reduction reaction current level of the protective layer 60 should be less than 0.01 $\mu A$. Thus, the oxidation or reduction reaction current level of the reaction layer 40 is preferably greater than or equal to more than 100 times (inclusive) the oxidation or reduction reaction current level of the protective layer 60. In some embodiments, the role of the protective layer 60 relatives to the reaction layer 40 may also change so that the protective layer 60 does not affect the results of the concentration measurement reaction.

In some embodiments, the branch 22A of the working electrode 22 is provided to provide the protective layer 60 a conductive platform. In some embodiments, the working electrode 22 and the branch 22A thereof may have the same or different materials. In some embodiments, the branch 22A of the working electrode 22 may include carbon, such as a carbon layer. In other embodiments, the working electrode 22 may not have a branch 22A, and the protective layer 60 may be provided directly on the working electrode 22.

The present disclosure is not limited to the foregoing embodiments and can comprise other different embodiments. For simplification purposes and to facilitate the comparison among embodiments of the present disclosure, in the following embodiments, each of the completely the same elements is labeled with completely the same reference numeral. To further facilitate the comparison among the differences between these embodiments, only the differences among different embodiments are discussed, whereas the completely the same features are not discussed for the sake of brevity.

Figure 5:
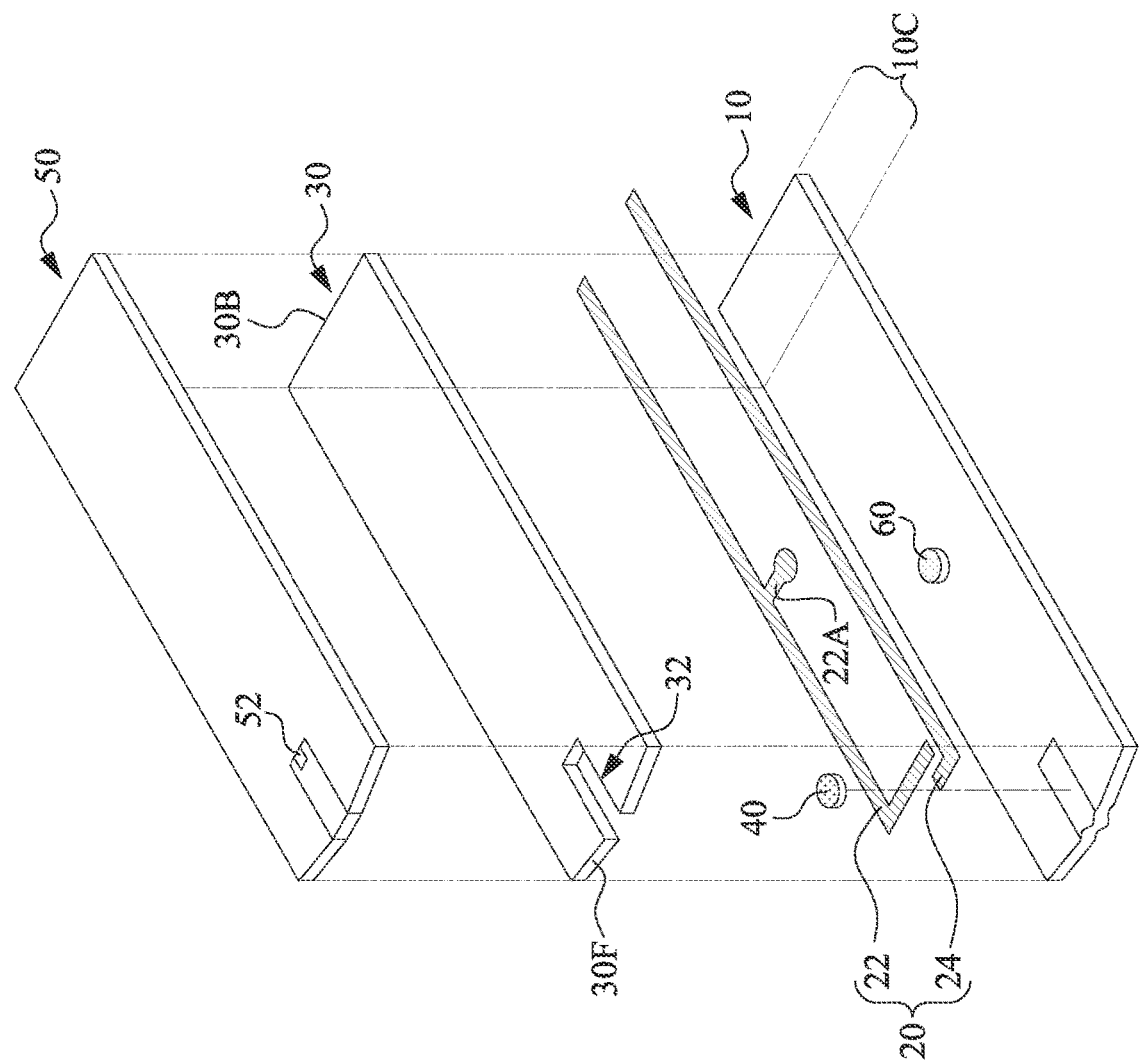
FIG. 5 is a schematic exploded view illustrating a biochemical test chip according to some embodiments of the present disclosure.

In some embodiments, the protective layer 60 can configured to protect the electrode unit 20. Reference is made to FIG. 5; FIG. 5 is a schematic exploded view illustrating a biochemical test chip 200 according to some embodiments of the present disclosure. As shown in FIG. 5, the difference between the biochemical test chip 200 and the biochemical test chip 100 is that the electrode unit 20 and the protective layer 60 locate at substantially the same level. In some embodiments, only a portion of the electrode unit 20 is disposed on the protective layer 60. For example, the electrode unit 20 includes a branch, wherein the branch is disposed on the protective layer 60. The branch can be the branch 22A of the working electrode 22, the branch 24A of the counter electrode 24 (shown in FIG. 8), or the branch of a reference electrode. In some embodiments, the branch can be configured to provide the protective layer 60 a conductive platform.

In the present embodiment, the working electrode 22 of the electrode unit 20 is disposed on the protective layer 60, and the counter electrode 22 of the electrode unit 20 and the protective layer 60 are disposed on the same level; however, the present disclosure is not limited thereto. In some embodiments, only the branch 22A of the working electrode 22 in the electrode unit 20 is disposed on the protective layer 60. For example, the working electrode 22 and the protective layer 60 locate at substantially the same level; only the branch 22A of the working electrode 22 is disposed on the protective layer 60. In the present embodiment, the first insulating septum 30 and the second insulating septum 50 do not have the opening 34 and the opening 54; however, the present disclosure is not limited thereto. In other embodiments, openings may be disposed on the first insulating septum 30 and the second insulating septum 50 depending on the system requirements. For example, the first insulating septum 30 can have the opening 34, and the second insulating septum 50 can have the opening 54, wherein the opening 34 and the opening 54 at least partially expose the branch 22A of the working electrode 22.

In some embodiments, the electrode unit 20 completely covers the protective layer 60, and the reactive layer 40 is disposed on the electrode unit 20. In detail, the working electrode 22 of the electrode unit 20 completely covers the protective layer 60. In some embodiments, the branch 22A of the working electrode 22 can completely cover the protective layer 60. In some embodiments, the area of the branch 22A of the working electrode 22 is greater than the area of the protective layer 60. In some embodiments, the thickness of the working electrode 22 is greater than the thickness of the protective layer 60. In some embodiments, the thickness of the working electrode 22 is substantially the same as the thickness of the protective layer 60.

As shown in FIG. 5, the biochemical test chip 200 is disposed with the protective layer 60, and the protective layer 60 is electrically connected to the electrode unit 20. In some embodiments, the protective layer 60 is configured to protect the electrode unit 20. In some embodiments, the protective layer 60 is configured to protect part of or the whole electrode unit 20. In some embodiments, the protective layer 60 is configured to protect the portion of the electrode unit 20 that is made of the active material or the whole electrode unit. The active material can include a conductive material, such as silver or other suitable metal materials. In the present embodiment, the protective layer 60 is configured to protect the working electrode 22 of the electrode unit 20. For example, the material of the working electrode 22 can include silver; however, silver tends to react with oxygen and water vapor in the air and get oxidized into silver oxide, wherein the reaction equation can be expressed as $4Ag+O_2 \rightarrow 2Ag_2O$. When silver is oxidized into silver oxide after being exposed to the air, it will result in the toxification on the surface of the working electrode 22; thereby reducing the working electrode 22's conductivity and its capability to receive electrons; such spoilage will result in measurement errors when the biochemical test chip 200 is subject to the concentration measurement.

The biochemical test chip 200 according to the present disclosure is disposed with the protective layer 60, wherein the protective layer 60 is electrically connected to the electrode unit 20. Thus, when the biochemical test chip 200 is exposed to the environment and before the specimen is loaded, the electrode unit 20, the protective layer 60, and air form a chemical reaction tank. In the present embodiment, the material of the protective layer 60 can include ferrocene, wherein the ferric iron located at the center of ferrocene is susceptible to valence transition and undergoes the redox reaction, wherein the reaction equation can be expressed as $Fe^{II}(C_5H_5)_2 \rightarrow Fe^{III}(C_5H_5)_2 + e^-$, and the standard reduction potential thereof is about 0.16 V. The standard reduction potential of silver oxide/silver is about 1.17 V. The standard reduction potential of ferrocene is smaller than the standard reduction potential of silver oxide/silver. Thus, in the present embodiment, the protective layer 60 is the anode, whereas the electrode unit 20 is the cathode. The potential difference ($E_{cell}^0$) between the protective layer 60 and the electrode unit 20 is about 1.01 V. Since the potential difference between the two is greater than 0, the change in free energy is smaller than 0, and hence, silver oxide in the electrode unit 20 undergoes the spontaneous reduction reaction into silver, wherein the reaction equation can be expressed as $2Fe^{II}(C_5H_5)_2 + Ag_2O + 2H^+ \rightarrow 2Fe^{III}(C_5H_5)_2 + 2Ag + H_2O$.

In view of the above, silver oxide in the working electrode 22 is reduced to silver because of ferrocene's oxidation reaction in the protective layer 60. When the protective layer 60 is oxidized, the working electrode 22 of the electrode unit 20 undergoes the reduction reaction, thereby slowing the oxidation reaction of oxygen and water vapor in the air. Therefore, by disposing the protective layer 60 in the biochemical test chip 200, one can effectively prevent the electrode unit 20 from spoilage before measuring the specimen. The composition materials of the electrode unit 20 and the protective layer 60 are not limited thereto.

The material of the protective layer 60 is not limited to ferrocene. In some embodiments, the material of the protective layer 60 can include a metallocene or a macrocycle; however, the present disclosure is not limited thereto. For example, the metallocene can include vanadocene, chromocene, manganocene, ferrocene, cobaltocene, nickelocene, rhodocene, etc. The macrocycle can include iron phthalocyanine, cobalt phthalocyanine, nickel phthalocyanine, copper phthalocyanine, etc.

In the present embodiment, a method for protecting the biochemical test chip 200 is provided. In detail, the present method for protecting the biochemical test chip 200 includes providing the protective layer 60 electrically connected to the electrode unit 20. The protective layer 60 is configured to reduce the electrode unit 20 after the electrode unit 20 loses electrons. As discussed above, silver in the electrode unit 20 tends to be oxidized into silver oxide by oxygen when being exposed to the air. Hence, one may choose a material with a standard reduction potential smaller than the standard reduction potential of silver/silver oxide as the protective layer 60; for example, one may choose ferrocene as the protective layer 60. Therefore, after the electrode unit 20 loses electrons, the protective layer 60 allows the electrode unit 20 to undergo the reduction reaction so that the electrode unit 20 returns to the default state. In the present embodiment, the standard reduction potential of the electrode unit 20 is greater than the standard reduction potential of the protective layer 60; however, the present disclosure is not limited thereto.

In other embodiments, the standard reduction potential of the electrode unit 20 is smaller than the standard reduction potential of the protective layer 60. For example, the present disclosure further provides a method for protecting the biochemical test chip 200, including providing the protective layer 60 that is electrically connected to the electrode unit 20. The protective layer 60 is configured to oxidize the electrode unit 20 after the electrode unit 20 receives electrons. As discussed above, one can choose a material with a standard reduction potential greater than the standard reduction potential of the electrode unit 20 as the protective layer 60. Therefore, after the electrode unit 20 receives electrons, the protective layer 60 allows the electrode unit 20 to undergo the oxidation reaction so that the electrode unit 20 returns to the default state.

The foregoing is only an example of the protective layer 60 and the electrode unit 20, and the present disclosure is not limited thereto. By choosing appropriate materials as the protective layer 60, the potential difference ($E_{cell}^0$) between the protective layer 60 and the electrode unit 20 can be greater than 0. In this way, the protective layer 60 and the electrode unit 20 are in spontaneous reactions, thereby protecting the biochemical test chip 200 and prolonging the shelf-life of the biochemical test chip 200.

Figure 6:
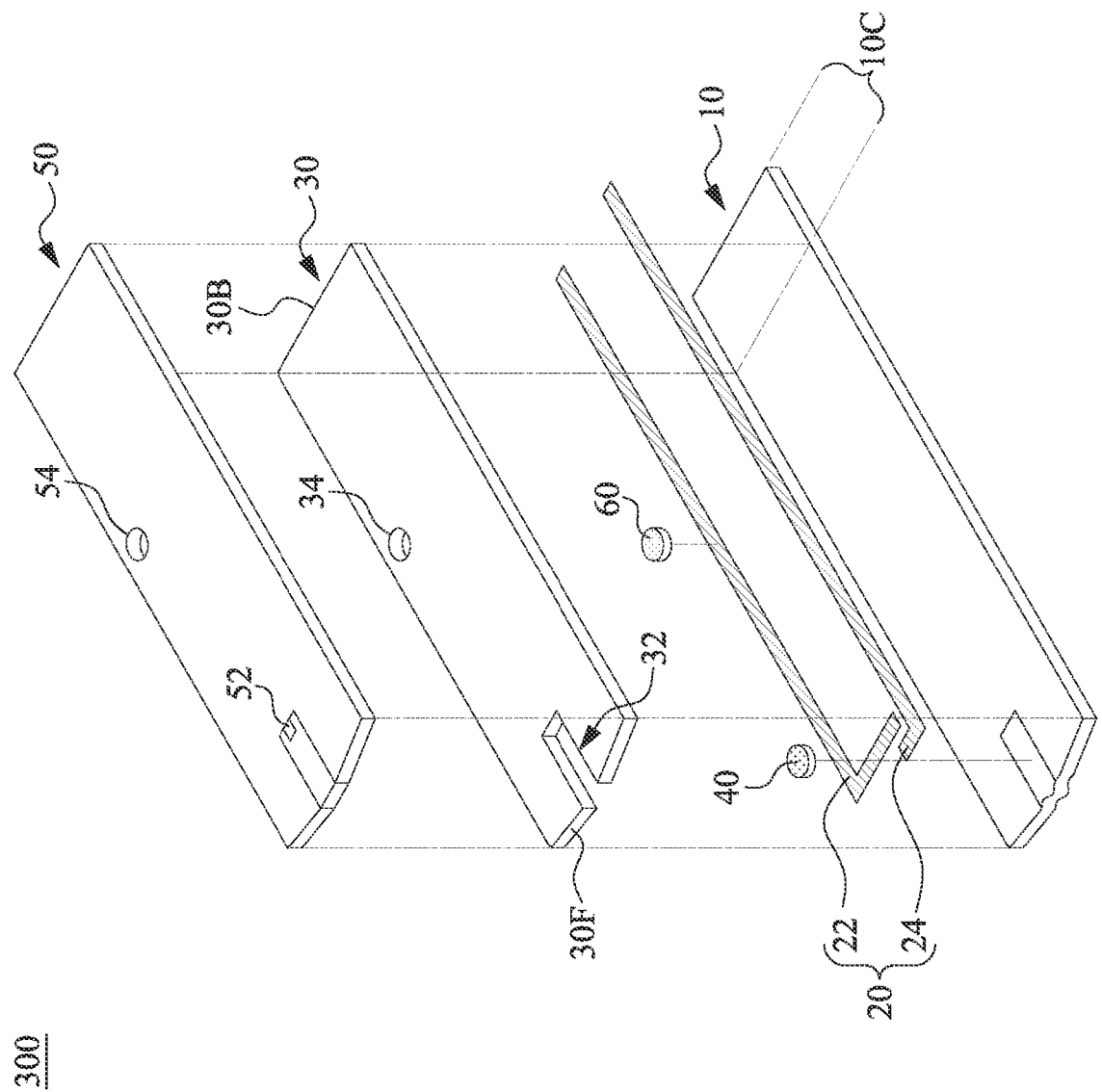
FIG. 6 is a schematic exploded view illustrating a biochemical test chip according to some embodiments of the present disclosure.

Reference is made to FIG. 6; FIG. 6 is a schematic exploded view illustrating a biochemical test chip 300 according to some embodiments of the present disclosure. As shown in FIG. 6, the difference between the biochemical test chip 300 and the biochemical test chip 100 is that the electrode unit 20 of the biochemical test chip 300 does not include the branch 22A. In some embodiments, the protective layer 60 can be directly disposed on the working electrode 22 of the electrode unit 20; however, the present disclosure is not limited thereto. In other embodiments, the protective layer 60 can be directly disposed on the counter electrode 24 of the electrode unit 20.

Figure 7:
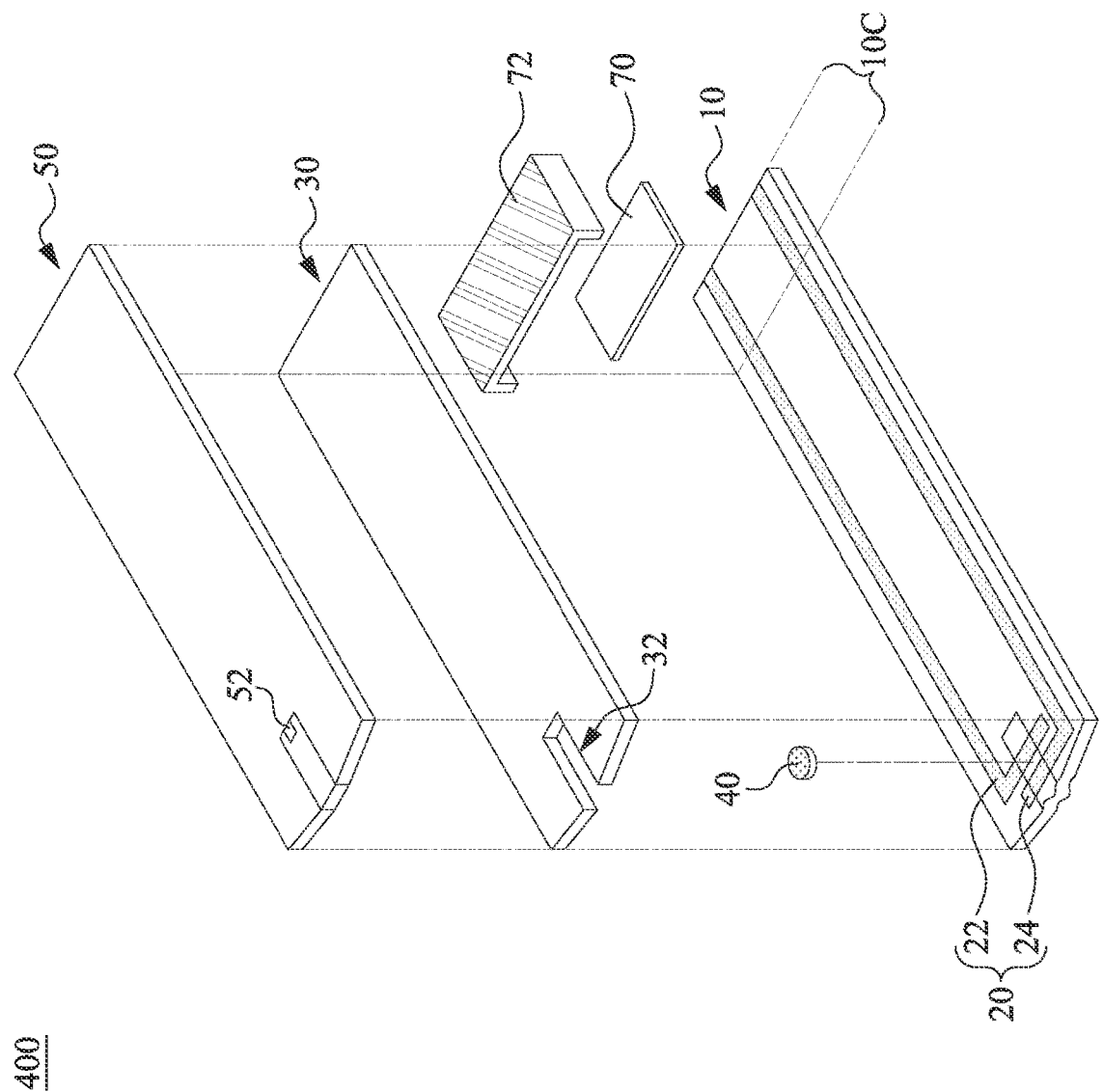
FIG. 7 is a schematic exploded view illustrating a biochemical test chip according to some embodiments of the present disclosure.

Reference is made to FIG. 7; FIG. 7 is a schematic exploded view illustrating a biochemical test chip 400 according to some embodiments of the present disclosure. As shown in FIG. 7, the difference between the biochemical test chip 400 and the biochemical test chip 100 is that the biochemical test chip 400 includes a detachable protective layer 70, instead of the protective layer 60. Generally, during the production or manufacturing process of the biochemical test chip 400, components in the biochemical test chip 400 may be spoiled due to the manufacturing environment. For example, the reactive layer 40 is in the liquid form before being dried, and the electrode unit 20 is subject to a high-temperature electrode manufacturing process; this unavoidable environment of high temperature, high humidity, and light irradiation will result in the spoilage of the biochemical test chip 400, thereby leading to measurement errors. Thus, in some embodiments, the biochemical test chip 400 further includes the detachable protective layer 70. When the biochemical test chip 400 is at rest, the detachable protective layer 70 can be used to restore the spoiled unit to the default state. It is worth noting that the detachable protective layer 70 of the present embodiment refers to a protective layer that is not disposed in the biochemical test chip 400, and the detachable protective layer 70 is replaceable and can be removed before being connected with a measuring apparatus subjected to measurement reaction. In some embodiments, an external force (e.g., applying a voltage) can be applied on the detachable protective layer 70 to accelerate the restoration of the biochemical test chip 400.

In some embodiments, the detachable protective layer 70 is electrically connected to the electrode unit 20 so as to restore the biochemical test chip 400 to the default state. As shown in FIG. 7, the detachable protective layer 70 is covered on the electrode unit 20 via the insulation tape 72. After the biochemical test chip 400 returns to the default state, the detachable protective layer 70 can electrically isolate the electrode unit 20. For example, the detachable protective layer 70 can be removed by stripping off the insulation tape 72. In some embodiments, the detachable protective layer 70 is electrically connected to the reactive layer 40. In some embodiments, the detachable protective layer 70 is connected to the counter electrode 24.

Figure 8:
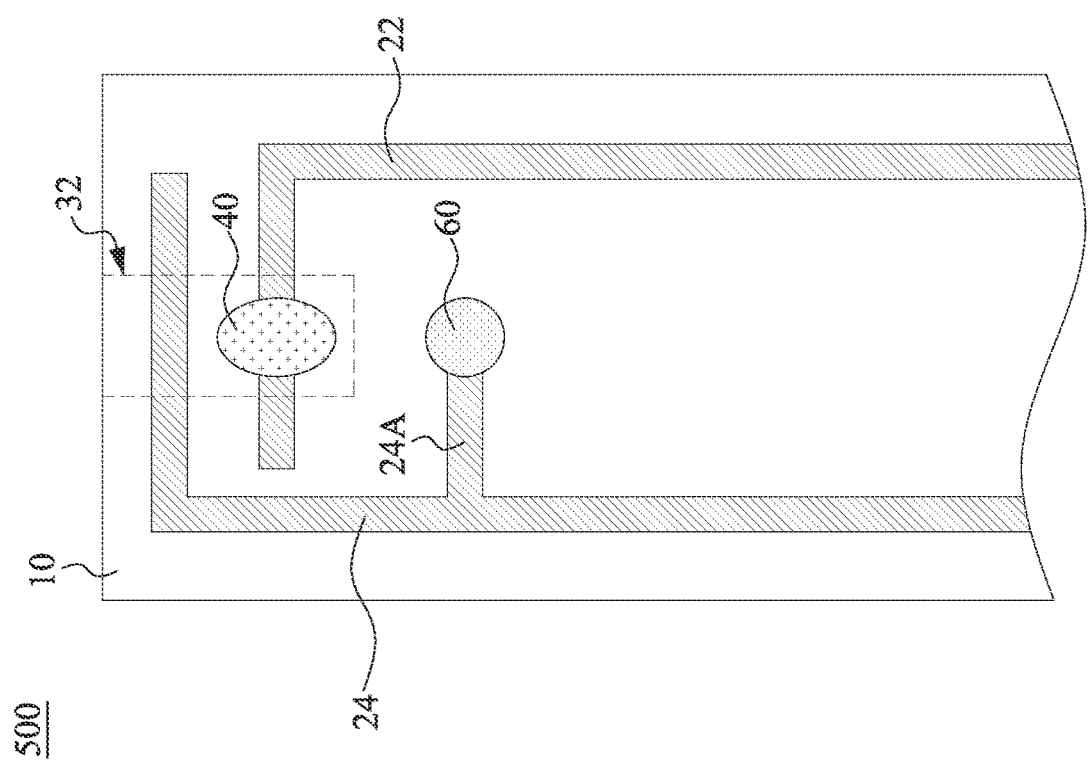
FIG. 8 is a partial top view illustrating a biochemical test chip according to some embodiments of the present disclosure

Reference is made to FIG. 8; FIG. 8 is a partial top view illustrating a biochemical test chip 500 according to some embodiments of the present disclosure. As shown in FIG. 8, the difference between the biochemical test chip 500 and the biochemical test chip 100 is that the protective layer 60 of the biochemical test chip 500 is disposed on one side of the counter electrode 24. In the present embodiment, the protective layer 60 is electrically connected to the counter electrode 24. The protective layer 60 is configured to protect the counter electrode 24. In some embodiments, the protective layer 60 can be disposed on the counter electrode 24. For example, the protective layer 60 can be disposed on the branch 24A of the counter electrode 24. In some embodiments, the protective layer 60 can also be disposed under the counter electrode 24. The relative positions of the protective layer 60 and the electrode unit 20 can be adjusted depending on the system requirements.

Figure 9:
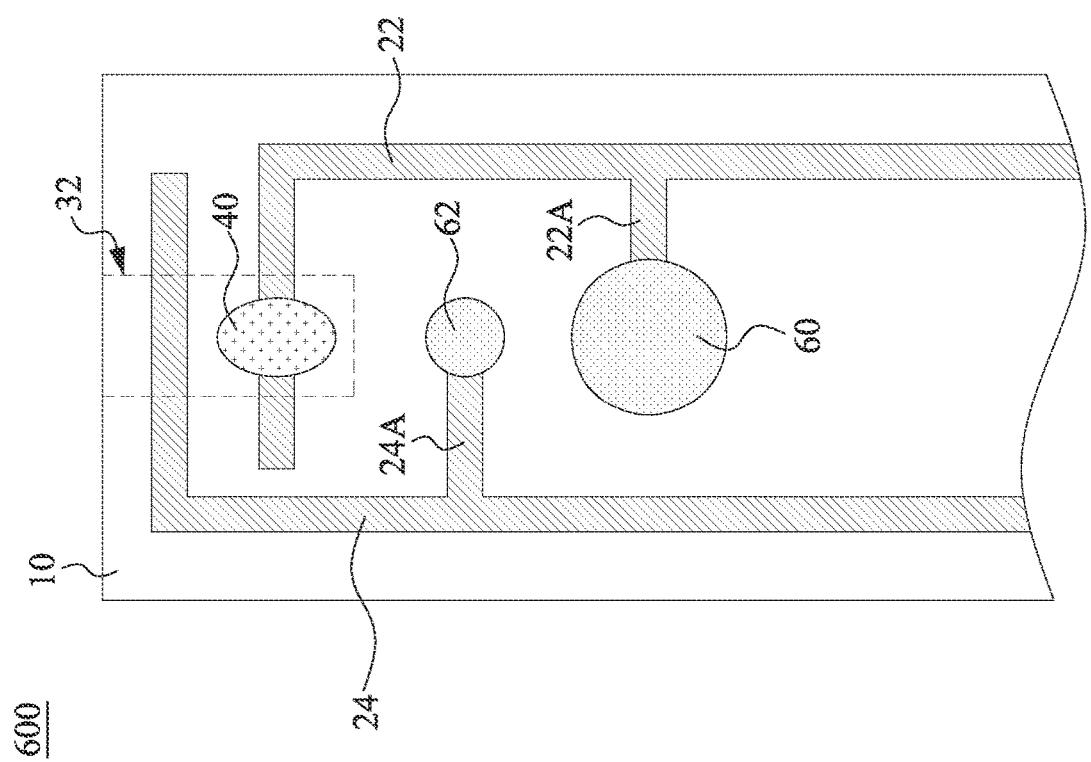
FIG. 9 is a partial top view illustrating a biochemical test chip according to some embodiments of the present disclosure FIG. 10A and FIG. 10B provide test results from samples with five different blood glucose concentrations to illustrate the difference between the present disclosure and conventional techniques.

Reference is made to FIG. 9; FIG. 9 is a partial top view illustrating a biochemical test chip 600 according to some embodiments of the present disclosure. As shown in FIG. 9, the difference between the biochemical test chip 600 and the biochemical test chip 100 is that the biochemical test chip 600 can include multiple protective layers 60, 62, such as the protective layer 60 and the protective layer 62. The protective layer 60 is electrically connected to the working electrode 22, whereas the protective layer 62 is electrically connected to the counter electrode 24. The protective layer 60 is configured to protect the working electrode 22 or the reactive layer 40, whereas the protective layer 62 configured to protect the counter electrode 24. In the present embodiment, the reactive layer 40 is only in contact with the working electrode 22 but is not in contact with the counter electrode 24. Therefore, the protective layer 60 is electrically connected to the reactive layer 40 via the working electrode 22.

The biochemical test chip 600 can protect different regions in the biochemical test chip 600 by disposing multiple protective layers. For example, the protective layer 60 is configured to protect the stability of the reactive layer 40, whereas the protective layer 62 is configured to protect the counter electrode's stability 24. In other embodiments, the protective layer 60 is configured to protect the stability of the working electrode 22, whereas the protective layer 62 is configured to protect the stability of the counter electrode 24. The protective layer 60 and the protective layer 62 can have the same or different materials. Moreover, the protective layer 60 and the protective layer 62 can have different areas; however, the present disclosure is not limited thereto. In some embodiments, the area of the protective layer 60 is greater than the area of the protective layer 62. In some embodiments, the protective layer 60 and the protective layer 62 locate at a different level; however, the present disclosure is not limited thereto. For example, the protective layer 60 can locate on the working electrode 22, whereas the protective layer 62 can locate under the counter electrode 24.

Figure 10A:
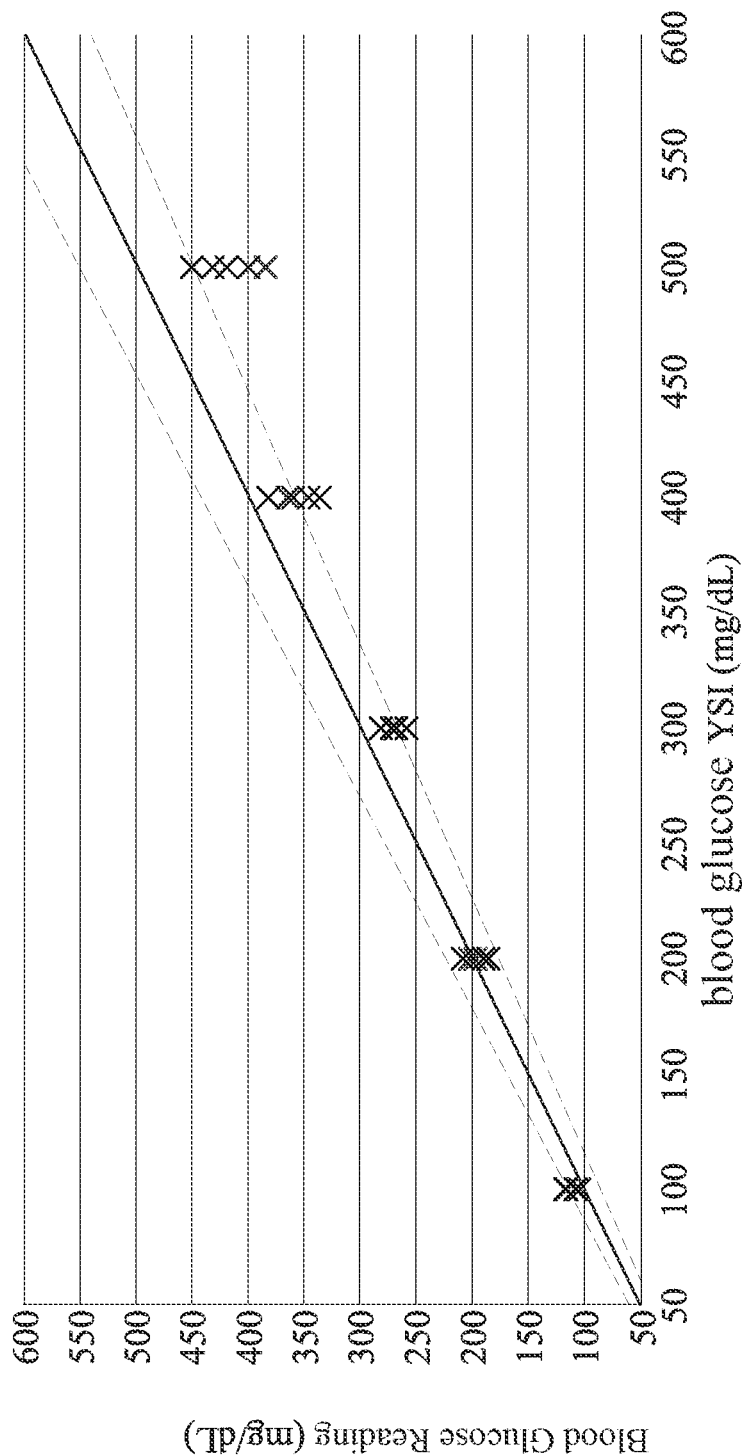
Figure 10B:
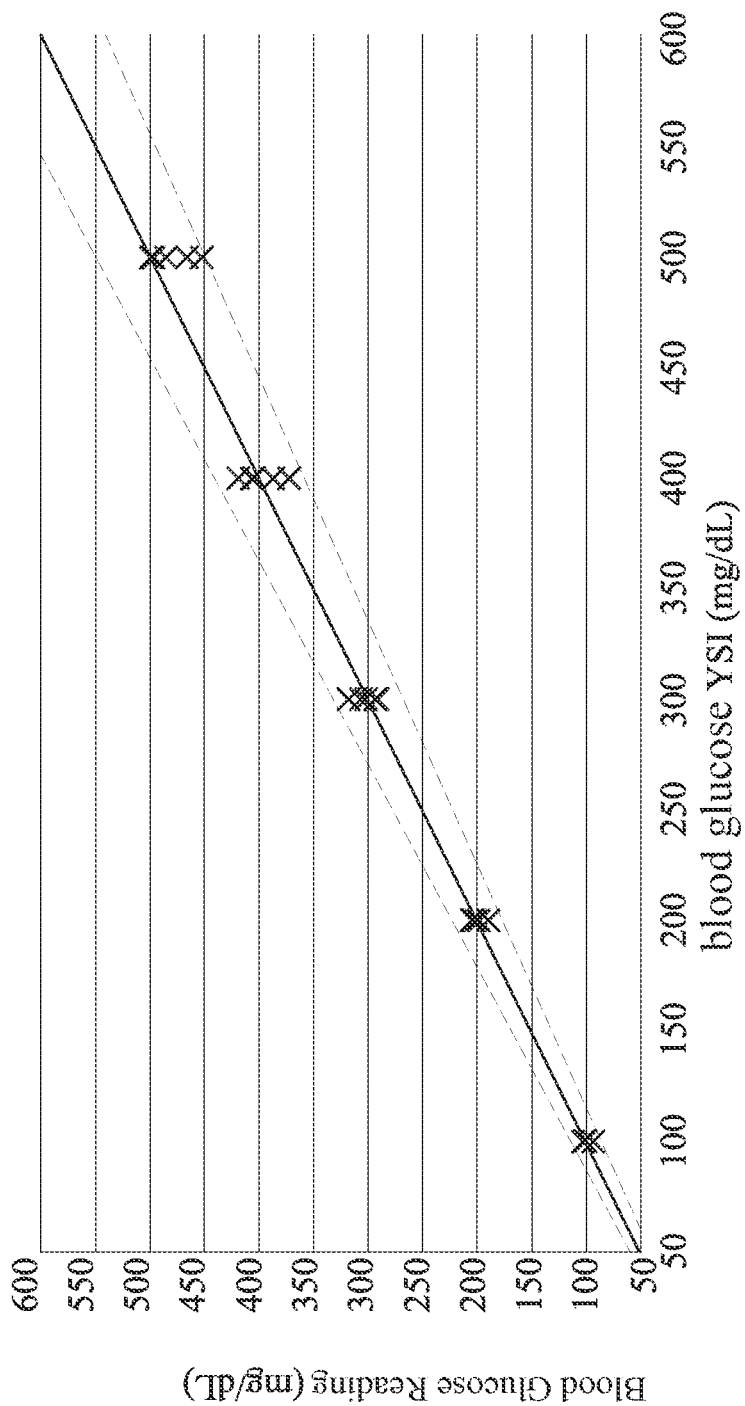

FIG. 10A and FIG. 10B provide test results from samples with five different blood glucose concentrations to illustrate the difference between the present disclosure and conventional techniques. In detail, FIG. 10A and FIG. 10B show the signal regression analysis of five replicate experiments of five blood glucose specimens (100 mg/dL, 200 mg/dL, 300 mg/dL, 400 mg/dL, and 500 mg/dL) measured by biochemical test chip with accelerated aging at 50° C. for four weeks and a biochemical analyzer. FIG. 10A shows the signal of the biochemical specimen without the protective layer, and FIG. 10B shows the signal of the biochemical specimen with the protective layer. The solid lines in FIG. 10A and FIG. 10B are standard values.

As shown in FIG. 10A, when the blood glucose concentration is 100 mg/dL, the signal expression of biochemical test chip without the protective layer is relatively high. Moreover, when the blood glucose concentration is greater than 300 mg/dL (inclusive), the signals of the biochemical test chip without the protective layer are all lower than the biochemical analyzer and all exceed the acceptable range of ±10%. As shown in FIG. 10B, when the blood glucose concentration is lower than 300 mg/dL (inclusive), the signals obtained by the biochemical test chip according to the present disclosure are relatively concentrated and are similar to the biochemical analyzer results. Moreover, at all the blood glucose, the signals obtained by the biochemical test chip according to the present disclosure are all within the acceptable range.

The foregoing discussion of the present disclosure provides a biochemical test chip disposed with a protective layer, wherein the protective layer can be used to maintain the stability of the biochemical test chip's reactive layer so as to protect the biochemical test chip, delay or avoid the unwanted spoilage of the biochemical test chip with the environment, thereby prolonging the shelf-life of the biochemical test chip. Besides, the biochemical test chip can be disposed with a plurality of protective layers to protect different components of the biochemical test chip. For example, the protective layer can further protect the working electrode or the counter electrode and the like so as to decrease the measurement error. Moreover, the biochemical test chip can further include a detachable protective layer so as to accelerate the process for the biochemical test chip to return to the default state.

Although the disclosure and its advantages have been described in detail, it should be understood that various modifications, substitutions, and replacements can be made without departing from the spirit and scope of the present disclosure as defined by the appended claims. Besides, the scope of the present application is not limited to specific examples of processes, machines, manufactures, material components, means, methods, and procedures described in the specification. Those skilled in the art can understand from the disclosure of the present application that existing or future developed processes, machinery, manufacturing, and materials that have the same functions or achieve substantially the same results as the corresponding embodiments described herein can be used according to this disclosure. Accordingly, such process, machine, manufacture, material composition, means, method, or step fall within the protection scope of the present application.

What is claimed is:

1. A biochemical test chip, comprising:
an electrode unit, including a working electrode and a counter electrode;
a reactive layer, electrically connected to the working electrode;
a protective layer, electrically connected to the working electrode or the counter electrode, wherein the protective layer is configured to oxidate the electrode unit after the electrode unit receives an electron or reduce the electrode unit after the electrode unit loses an electron, wherein a standard reduction potential of the protective layer is higher than a standard reduction potential of the reactive layer;
a first insulating septum, located on the electrode unit and including a first opening; and
a second insulating septum, located on the first insulating septum and including a second opening, wherein the protective layer is vertically aligned with the first opening and the second opening,
the first insulating septum is between the protective layer and the second insulating septum,
a portion of the first insulating septum and a portion of the second insulating septum form a capillary structure located at a front side of the first insulating septum and the second insulating septum, and
the capillary structure extends from outer peripheral edges of the first insulating septum and the second insulating septum, and the first and second openings are positioned over the protective layer and are separated from and fluid incommunicable with the capillary structure.

2. The biochemical test chip of claim 1, wherein a potential difference ($E_{cell}^{o}$) between the protective layer and reactive layer is greater than 0.

3. The biochemical test chip of claim 1, wherein the protective layer is a cathode, and the electrode unit is an anode.

4. The biochemical test chip of claim 1, wherein the first opening is between the protective layer and the second opening.

5. The biochemical test chip of claim 1, wherein the capillary structure at least partially exposes the reactive layer.

6. The biochemical test chip of claim 1, wherein the electrode unit comprises a branch, wherein the branch is configured to provide the protective layer a conductive platform.

7. The biochemical test chip of claim 1, wherein the electrode unit and the protective layer are substantially located at a same level.

8. The biochemical test chip of claim 1, wherein at least a portion of the electrode unit is made of an active material and is in contact with air.

9. The biochemical test chip of claim 8, wherein the protective layer is configured to protect the portion of the electrode unit that is made of the active material or the whole electrode unit.

10. A biochemical test chip, comprising:
a reactive layer and an electrode unit, wherein the reactive layer is electrically connected to the electrode unit;
a protective layer, electrically connected to the electrode unit, wherein the protective layer is electrically connected to the reactive layer via the electrode unit, and the protective layer is configured to oxidate the reactive layer after the reactive layer receives an electron or reduce the reactive layer after the reactive layer loses an electron, wherein there is a potential difference ($E_{cell}^{o}$) between the protective layer and the reactive layer;
a first insulating septum, located on the electrode unit and including a first opening; and
a second insulating septum, located on the first insulating septum and including a second opening,
wherein the protective layer is vertically aligned with the first opening and the second opening,
the first insulating septum is between the protective layer and the second insulating septum,
a portion of the first insulating septum and a portion of the second insulating septum form a capillary structure located at a front side of the first insulating septum and the second insulating septum, and
the capillary structure extends from outer peripheral edges of the first insulating septum and the second insulating septum, and the first and second openings are positioned over the protective layer and are separated from and fluid incommunicable with the capillary structure.

11. The biochemical test chip of claim 10, wherein the potential difference ($E_{cell}^{o}$) is greater than 0.

12. The biochemical test chip of claim 10, wherein the protective layer is an anode, and the reactive layer is a cathode.

13. The biochemical test chip of claim 10, wherein the protective layer is a cathode, and the reactive layer is an anode.

14. The biochemical test chip of claim 10, wherein an oxidation or reduction reaction current level of the reactive layer is greater than an oxidation or reduction reaction current level of the protective layer.

15. The biochemical test chip of claim 10, wherein an oxidation or reduction reaction current level of the reactive layer is greater than or equal to 10-fold an oxidation or reduction reaction current level of the protective layer.

* * * * *